US012644434B2

(12) United States Patent
Qiao et al.

(10) Patent No.: US 12,644,434 B2
(45) Date of Patent: Jun. 2, 2026

(54) INTEGRATED VESSEL WITH WAVE COMPENSATION CAPABILITY FOR TRANSPORTING COMPLETED OFFSHORE WIND TURBINES AND INSTALLATION METHOD THEREOF

(71) Applicant: DALIAN UNIVERSITY OF TECHNOLOGY, Dalian (CN)

(72) Inventors: Dongsheng Qiao, Dalian (CN); Li Yin, Dalian (CN); Guoqiang Tang, Dalian (CN); Lin Lv, Dalian (CN); Jun Yan, Dalian (CN); Zhiwei Song, Dalian (CN); Jinping Ou, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 360 days.

(21) Appl. No.: 18/565,263

(22) PCT Filed: May 16, 2023

(86) PCT No.: PCT/CN2023/094420
§ 371 (c)(1),
(2) Date: Nov. 29, 2023

(87) PCT Pub. No.: WO2023/226818
PCT Pub. Date: Nov. 30, 2023

(65) Prior Publication Data
US 2025/0092858 A1 Mar. 20, 2025

(30) Foreign Application Priority Data
May 27, 2022 (CN) ......................... 202210586422.6

(51) Int. Cl.
*F03D 13/40* (2016.01)
*B63B 77/10* (2020.01)
(Continued)

(52) U.S. Cl.
CPC .............. *F03D 13/40* (2016.05); *B63B 77/10* (2020.01); *F03D 13/126* (2023.08); *F03D 13/25* (2016.05);
(Continued)

(58) Field of Classification Search
CPC ......... F03D 13/25; F03D 13/40; B63B 77/10; B63B 35/44; F05B 2240/95; F05B 2260/02
See application file for complete search history.

(56) References Cited

U.S. PATENT DOCUMENTS

| | | | |
|---|---|---|---|
| 9,889,908 B2 * | 2/2018 | Dekker | ................... B63B 27/30 |
| 2007/0102940 A1 * | 5/2007 | Hansen | ................... B63B 27/00 290/55 |

(Continued)

FOREIGN PATENT DOCUMENTS

| | | |
|---|---|---|
| CN | 102616338 A | 8/2012 |
| CN | 102730552 A | 10/2012 |

(Continued)

OTHER PUBLICATIONS

First Office Action issued in Chinese Patent Application No. 202210586422.6; mailed May 31, 2023; 18 pgs.

(Continued)

*Primary Examiner* — Michael H Wang
(74) *Attorney, Agent, or Firm* — HAUPTMAN HAM LLP

(57) ABSTRACT

An integrated vessel with wave compensation capability for transportation of completed offshore wind turbines includes a wind turbine conveyor system, a dynamic positioning propeller system, and a six-degree-of-freedom parallel manipulator system, as well as a foundation monopile of a fixed wind turbine arranged in the hull; the completed offshore wind turbines are fixed on the wind turbine con- (Continued)

veyor system by multiple wind turbine stabilizing blocks, and a clamping system is equipped in the six-degree-of-freedom parallel manipulator system. The invention uses the conveyor system to transfer and the clamping system to clamp the completed wind turbine, as well as the six-degree-of-freedom parallel manipulator system to transport, which reduces the difficulty of the operation, improves the automation of the installation process, and reduces the labor cost of the wind turbine installation; the invention reduces the difficulty of the installation process, and improves the efficiency of the wind turbine installation.

4 Claims, 3 Drawing Sheets

(51) Int. Cl.
  *F03D 13/10* (2016.01)
  *F03D 13/25* (2016.01)
(52) U.S. Cl.
  CPC ....... *F05B 2240/95* (2013.01); *F05B 2260/02* (2013.01)

(56) References Cited

U.S. PATENT DOCUMENTS

| | | | | |
|---|---|---|---|---|
| 2010/0316450 A1* | 12/2010 | Botwright | .............. | B63B 77/10 405/209 |
| 2014/0064856 A1* | 3/2014 | Westergaard | ....... | E02B 17/0004 114/72 |
| 2021/0261386 A1* | 8/2021 | Van Egmond | .......... | B66C 23/64 |
| 2022/0260057 A1* | 8/2022 | Falkenberg | ............. | F03D 13/25 |

FOREIGN PATENT DOCUMENTS

| | | | | | |
|---|---|---|---|---|---|
| CN | 103171741 | A | | 6/2013 | |
| CN | 108019321 | A * | 5/2018 | ............. | F03D 13/25 |
| CN | 207523898 | U | | 6/2018 | |
| CN | 110182323 | A | | 8/2019 | |
| CN | 111891299 | A | | 11/2020 | |
| WO | WO-2025082792 | A1 * | 4/2025 | ............. | B66C 13/08 |

OTHER PUBLICATIONS

International Search Report issued in International Patent Application No. PCT/CN2023/094420; mailed Jul. 27, 2023.

* cited by examiner

INTEGRATED VESSEL WITH WAVE COMPENSATION CAPABILITY FOR TRANSPORTING COMPLETED OFFSHORE WIND TURBINES AND INSTALLATION METHOD THEREOF

RELATED APPLICATIONS

The present application is a U.S. National Phase of International Application Number PCT/CN2023/094420 filed May 16, 2023, which claims priority to Chinese Application Number 202210586422.6 filed May 27, 2022.

TECHNICAL FIELD

The present invention relates to the technical field of offshore wind turbine installation in marine engineering. In particular, the present invention relates to an integrated vessel with wave compensation capability for transporting completed offshore wind turbines and installation method thereof.

BACKGROUND

Wind power is becoming increasingly popular due to the increasing energy demands and growing concerns about environmental issues such as global warming in society today. There are two types of wind power: onshore wind power and offshore wind power, and the offshore wind power has obvious advantages over the onshore wind power. Offshore wind speeds are higher, resulting in abundant wind energy resources. The small friction of sea surface, the high-quality of wind energy, and the stable dominant direction of sea wind contribute to the stable operation of wind turbines for extended periods. Moreover, offshore wind turbines have a considerable single unit capacity and large energy output. The development of offshore wind power greatly minimizes the negative impact on the environment, requires no valuable land resources, and has little impact on the lives of residents. Therefore, as offshore wind turbine installation technology gradually improves, offshore wind power is foreseeable as a development trend.

At present, the installation methods of offshore wind turbines are mainly divided into the split installation and the overall installation. The split installation refers to the pre-fabricated towers, nacelles, hubs, and blades as the individual components or the assembly parts, then transport them to designated sea areas and assembled at sea; this method encompasses multiple installation steps, intricate procedures, prolonged duration, and limited work efficiency. The overall installation involves assembling the prefabricated tower, nacelle, hub, and blades as a complete unit, then transport them to designated sea areas and install directly; the overall installation has high efficiency and short construction period, but has higher requirements on the transport vessels and the lifting equipment such as the floating cranes.

In current transportation and installation technology of the completed offshore wind turbines, and in most cases, a professional transport vessel is employed to transport the assembled wind turbines to a designated area, where it is then lifted and installed using a floating crane. The transportation and installation process are executed using two professional vessels, and when lifting a wind turbine by a floating crane, the relative motion of multiple bodies must be taken into account, which makes the floating crane operation process more difficult.

The overall installation method of floating crane is used for installation, which possesses a limited level of automation and challenging engineering operations. The installation process of wind turbines requires very high precision. However, during the overall installation of the completed wind turbine, this lifting method can result in significant relative motion between the base of the tower and the bottom of the installed foundation monopile of the fixed wind turbine. Therefore, it is only possible to select a favorable weather window for the installation, which significantly affects the installation efficiency of the wind turbines. In addition, the complex load effects need to be considered during the installation process of the wind turbine, comprising the wind load on the wind turbine, the wave load, wind load, and flow load on the floating crane, as well as the interconnection load between the wind turbine and the floating crane via the sling. Even if a jack-up crane is used, the wind load on the wind turbine and the interconnection load between the wind turbine and the floating crane via the sling need to be considered during the installation process. These load transfer processes are complex, and precisely calculating them are difficult.

To address the aforementioned issues, the integral installation vessel of offshore wind turbine is equipped with a dynamic positioning system. However, this system is powerless to deal with the wave-induced frequency response of the installation vessel, which also limits the operation window of the overall installation.

SUMMARY OF THE INVENTION

In order to solve the problems of challenging engineering operations, limited level of automation, complex load calculation, and short installation window during the overall installation process of offshore wind turbine, the present invention disclose an integrated vessel with wave compensation capability for transporting completed offshore wind turbines and installation method thereof.

To achieve the above objectives, this application discloses an integrated vessel with wave compensation capability for transporting completed offshore wind turbines, comprising a wind turbine conveyor system, a dynamic positioning propeller system, and a six-degree-of-freedom parallel manipulator system arranged in the hull. The completed wind turbines are fixed on the wind turbine conveyor system by multiple wind turbine stabilizing blocks. A clamping system is equipped in the six-degree-of-freedom parallel manipulator system.

Furthermore, the moving wind turbine conveyor system is equipped along the length direction of the hull; this system comprises the conveyor belt which is wrapped around the driving wheels and the driven wheels; the driving wheels and the driven wheels are arranged alternately, and each driving wheel is connected to an electric motor fixed on the hull. This application increases the number of driving wheels and driven wheels to provide sufficient transmission force and reduce the deformation of the conveyor belt while the moving of the fan stabilizing blocks and the completed wind turbines.

Furthermore, the wind turbine stabilizing blocks are placed on the conveyor belt, and the assembled wind turbines are inserted into the grooves of the wind turbine stabilizing blocks to ensure the stability of the completed wind turbines during transportation.

Furthermore, the dynamic positioning propeller system is installed at the bottom of the hull; the system comprises the propeller a, the propeller b, and the propeller c, which are distributed in the bow, middle and stern of the vessel. When the integrated vessel navigates to the vicinity of the completed foundation monopile of a fixed wind turbine, the dynamic positioning propeller system starts to work; the thrusts generated by the propellers resists the environmental forces acting on the vessel caused by wind, wave, current, etc., thus compensating for the low frequency motions of the integrated vessel.

Furthermore, the six-degree-of-freedom parallel manipulator system is installed at the stern of the hull; the system comprises the large hydraulic cylinder a, the large hydraulic cylinder b, the large hydraulic cylinder c, the large hydraulic cylinder d, the large hydraulic cylinder e, the large hydraulic cylinder f, the upper table of six-degree-of-freedom parallel manipulator, the lower Hooke hinges, and the upper Hooke hinges; the top of each large hydraulic cylinder is connected to the upper table of the six-degree-of-freedom parallel manipulator by the upper Hooke hinge, and the bottom is connected to the deck of the vessel by the lower Hooke hinge. The six-degree-of-freedom parallel manipulator system is used to drive the clamping system to move, thereby taking out the completed wind turbine from the wind turbine stabilizing block and moving it to the top of the completed foundation monopile of the fixed wind turbine for installation of the completed wind turbine. During this process, the six-degree-of-freedom parallel manipulator system compensates for the six-degree-of-freedom wave frequency motions of the integrated vessel; at the same time, the relative motion of the bottom of the tower of the completed wind turbine and the top of the foundation monopile of the fixed wind turbine is compensated in real time.

Furthermore, the large hydraulic cylinder a and the large hydraulic cylinder b are arranged in a V shape, the large hydraulic cylinder c and the large hydraulic cylinder d are arranged in a V shape, as well as the large hydraulic cylinder e and the large hydraulic cylinder f are arranged in a V shape.

Furthermore, the clamping system is located in the gap of the upper table of six-degree-of-freedom parallel manipulator; the system comprises the clamp plate a, the clamp plate b, the small hydraulic cylinder a, the small hydraulic cylinder b, the small hydraulic cylinder c, the small hydraulic cylinder d, the small hydraulic cylinder e, the small hydraulic cylinder f, the small hydraulic cylinder g, the small hydraulic cylinder h, the small Hooke hinges, and the hinge pin; the clamp plate a and the clamp plate b are connected the hinge pin; the one ends of the small hydraulic cylinder a, the small hydraulic cylinder b, the small hydraulic cylinder c, and the small hydraulic cylinder d are respectively connected to the clamp plate a by the small Hooke hinges, and the other ends are respectively connected to the upper table of six-degree-of-freedom parallel manipulator by the small Hooke hinges; the one ends of the small hydraulic cylinder e, the small hydraulic cylinder f, the small hydraulic cylinder g, and the small hydraulic cylinder h are respectively connected to the clamp plate b by the small Hooke hinges, and the other ends are respectively connected to the upper table of six-degree-of-freedom parallel manipulator by the small Hooke hinges. The clamping system relies on the six-degree-of-freedom parallel manipulator system to move; each small hydraulic cylinder extending and shrinking to ensure the convenience of the clamping system to clamp the completed wind turbines and the stability of the completed wind turbines during the transportation process.

Furthermore, the small hydraulic cylinder a and the small hydraulic cylinder d are located at the lower part of the clamp plate a, and the small hydraulic cylinder b and the small hydraulic cylinder c are located at the upper part of the clamp plate a and between the small hydraulic cylinder a and the small hydraulic cylinder d. The small hydraulic cylinder e and the small hydraulic cylinder h are located at the lower part of the clamp plate b, and the small hydraulic cylinder f and the small hydraulic cylinder g are located at the upper part of the clamp plate b and between the small hydraulic cylinder e and the small hydraulic cylinder h.

The present invention also provides an installation method of an integrated vessel with wave compensation capability for transporting completed offshore wind turbines, which comprises the following steps:

In the first step, the integrated vessel is berthed at the wind turbine assembly dock; the assembled wind turbine is hoisted to the wind turbine conveyor system of the integrated vessel using the lifting equipment of the dock, and placed the wind turbine above the wind turbine stabilizing block; the bottom of the wind turbine tower is inserted into the wind turbine stabilizing block.

In the second step, the integrated vessel navigates to the vicinity of the completed foundation monopile of a fixed wind turbine; at this time, the dynamic positioning propeller system starts to work, and the magnitude and direction of the output force of each propeller is changed, so that the foundation monopile of the fixed wind turbine is guided into the installation port located at the stern of the integrated vessel. Subsequently, the dynamic positioning propeller system compensates for the low frequency motions of the integrated vessel resulting from environmental forces caused by wind, wave, current, etc., ensuring that the foundation monopile of the fixed wind turbine remains within the installation port at the stern of the integrated vessel.

In the third step, the wind turbine conveyor system and the six-degree-of-freedom parallel manipulator system start to work; the wind turbine conveyor system drives the wind turbine stabilizing blocks and completed wind turbines towards the stern of the vessel, and the six-degree-of-freedom parallel manipulator system drives the clamping system to move to a position, which is parallel to the movement direction of the wind turbine conveyor system; subsequently, the wind turbine conveyor system continues to move until the clamping system reaches a position suitable for clamping.

In the fourth step, each small hydraulic cylinder of the clamping system shrinks, causing the opening of clamp plate a and clamp plate b, and the six-degree-of-freedom parallel manipulator system moves; once the clamp plate a and clamp plate b have been surrounded the wind turbine tower, six-degree-of-freedom parallel manipulator system moves to the designated position; each small hydraulic cylinder extends, causing the two clamp plates clamp the wind turbine tower, and the six-degree-of-freedom parallel manipulator system moves upward to extract the wind turbine tower from the wind turbine stabilizing block and transport the completed wind turbine to the top of the foundation monopile of the fixed wind turbine.

In the fifth step, the six-degree-of-freedom parallel manipulator system begins to compensate for the six-degree-of-freedom wave frequency motions of the integrated vessel, and the ship-mounted total station measures the relative motion between the bottom center of the wind turbine tower and the top center of the foundation monopile of the fixed wind turbine in real-time, thereby determining their relative position changes; the positional variation errors are compensated by the six-degree-of-freedom parallel manipulator system, ensuring that the bottom of the wind turbine tower remains stationary relative to the foundation monopile of the fixed wind turbine; during this process, the six-degree-of-freedom parallel manipulator system gradually decreases until the bottom of the wind turbine tower is successfully docked with the top of the foundation monopile of the fixed wind turbine, indicating the completion of the wind turbine installation.

In the sixth step, each small hydraulic cylinder of the clamping system shrinks, the two clamp plates open, and the six-degree-of-freedom parallel manipulator system moves, allowing the clamping system to disengage from the wind turbine tower. Then, each small hydraulic cylinder and each large hydraulic cylinder are reset.

In the seventh step, the dynamic positioning propeller system propels the integrated vessel, allowing it to move away from the wind turbine that is already installed, and the integrated vessel navigates to the next location to prepare for the next installation, and repeat the above steps.

The present invention adopts the above technical solutions and compares with existing technology, and it has the following advantages.

1) The wind turbine stabilizing blocks are arranged on the wind turbine conveyor system of the integrated vessel, which ensure the stability of the completed wind turbines during transportation.

2) By arranging the wind turbine conveyor system, the clamping system, and the six-degree-of-freedom parallel manipulator system on the integrated vessel, this can serve as a replacement for the widely used hoisting system in current wind turbine installation. The completed wind turbines are transferred by the conveyor system, clamped by the clamping system, and transported by the six-degree-of-freedom parallel manipulator system, reducing the difficulty of operation, increasing the automation of the installation process, and reducing the labor cost of wind turbine installation. This approach reduces the difficulty of the installation process, improves the efficiency of the wind turbine installation, and saves the working time of the engineering, which enables the completed wind turbines to the overall loading from the wind turbine assembly dock, transportation and installation of the completed wind turbine. It provides convenient conditions for the overall rapid installation of completed wind turbines in the offshore wind power installation industry.

3) The dynamic positioning propeller system and the six-degree-of-freedom parallel manipulator system are arranged on the integrated vessel to compensate for the low frequency motions and wave frequency motions of the integrated vessel during the overall installation process of completed wind turbine. At the same time, real-time monitoring of the motion of the bottom of the completed wind turbine tower and the top of the foundation monopile of the wind turbine is further compensated using the six-degree-of-freedom parallel manipulator system to ensure that the wind turbine tower remains stationary relative to the foundation monopile of the wind turbine. The use of active wave compensation technology greatly increases the operating window period of the completed wind turbine installation.

4) During the installation process of the integrated vessel with wave compensation capability for transporting completed offshore wind turbines, the rigidity of the connections between each part allows the completed wind turbine and the integrated vessel can be considered as a whole, which simplifies the process of the load transfer and reduces the difficulty of the load calculation.

EXPLANATION OF THE NUMBERS IN THE FIGURE

Figure 1:
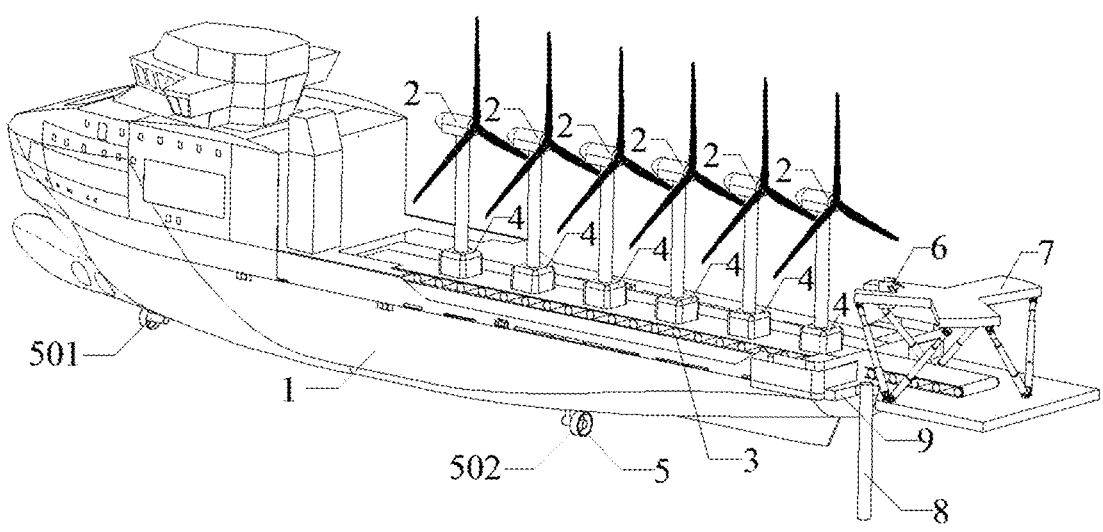
FIG. 1 is a schematic structural diagram of an integrated vessel for transporting completed offshore wind turbines.

1. Hull; 2. Completed wind turbines; 3. Wind turbine conveyor system; 301. Conveyor belt; 302. Driving wheel; 303. Driven wheel; 4. Wind turbine stabilizing blocks; 5. Dynamic positioning propeller system; 501. Propeller a; 502. Propeller b; 503. Propeller c; 6. Clamping system; 601. Clamp plate a; 602. Clamp plate b; 603. Small hydraulic cylinder a; 604. Small hydraulic cylinder b; 605. Small hydraulic cylinder c; 606. Small hydraulic cylinder d; 607. Small hydraulic cylinder e; 608. Small hydraulic cylinder f; 609. Small hydraulic cylinder g; 610. Small hydraulic cylinder h; 611. Small Hooke hinges; 612. Hinge pin; 7. Six-degree-of-freedom parallel manipulator system; 701. Large hydraulic cylinder a; 702. Large hydraulic cylinder b; 703. Large hydraulic cylinder c; 704. Large hydraulic cylinder d; 705. Large hydraulic cylinder e; 706. Large hydraulic cylinder f; 707. Upper table of six-degree-of-freedom parallel manipulator; 708. Lower Hooke hinges; 709. Upper Hooke hinges; 8. Foundation monopile of the wind turbine; 9. Installation port at the stern of the integrated vessel.

DETAILED DESCRIPTION OF THE INVENTION

In order to make the purpose, technical scheme and advantages of the present application more clear, the present application will provide further detailed explanation with the combination of the accompanying drawings and the example. It should be understood that the specific example described here is only used to clarify the application and should not be used to restrict the application. In other words, the described example is only a subset of the example of this application, not all of the example. Generally, the components of the example presented in this application can be arranged and designed in various configurations, which is described and illustrated in the accompanying drawings.

It should be noted that the term "comprises" or any other variation is intended to cover a non-exclusive inclusion, encompassing a process, method, article or device that contains both the listed elements and any other elements not explicitly mentioned, and it also encompasses the inherent elements of a process, method, article or device.

In the description of the present invention, it should also be noted that, unless otherwise clearly stated and limited, the terms "arranged", "installation", "interconnection" and "connected" should be general understanding. For example, it can be a fixed connection, a detachable connection, or an integral connection; it can be a mechanical connection, or an electrical connection; it can be a direct connection, an indirect connection by an intermediate medium, or an internal connection of the two components. For ordinary technical personnel in this field, they can understand the specific meanings of the above terms in this invention based on specific conditions.

Example 1

This example provides an integrated vessel with wave compensation capability for transporting completed offshore wind turbines, comprising: a wind turbine conveyor system, a dynamic positioning propeller system, and a six-degree-of-freedom parallel manipulator system arranged in the hull; the completed wind turbines are fixed on the wind turbine conveyor system by multiple wind turbine stabilizing blocks, and a clamping system is equipped in the six-degree-of-freedom parallel manipulator system.

As shown in FIGS. 1-4, the moving wind turbine conveyor system 3 is equipped on the deck along the length direction of the hull 1; the wind turbine conveyor system 3 is equipped with the driving wheels 302 and the driven wheels 303 to provide sufficient transmission force. At the same time, this arrangement can reduce the deformation of the conveyor belt 301 while the moving of wind turbine stabilizing blocks 4 and the completed wind turbines 2 driven by the wind turbine conveyor system 3.

Figure 2:
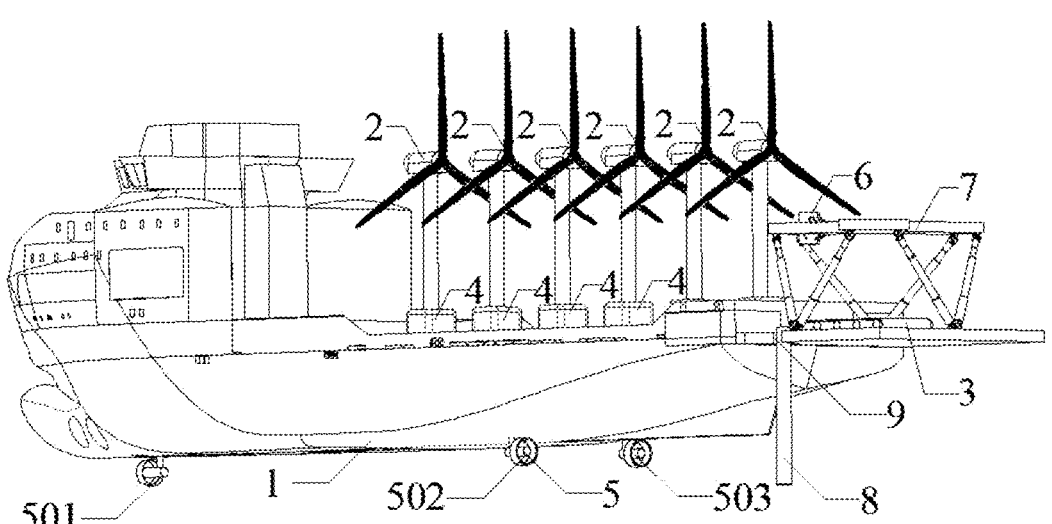
FIG. 2 is a schematic structural diagram b of an integrated vessel for transporting completed offshore wind turbines.
Figure 3:
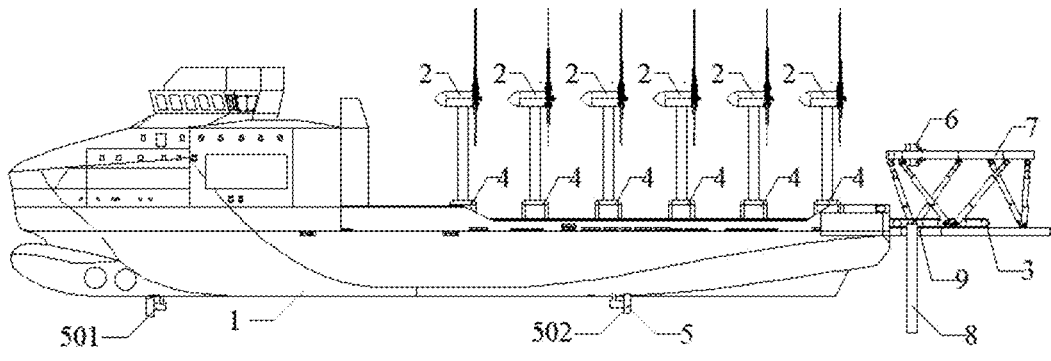
FIG. 3 is a left view of an integrated vessel for transporting completed offshore wind turbines.
Figure 4:
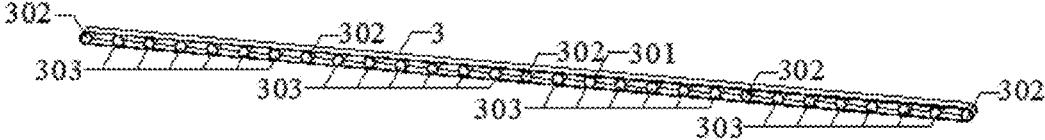
FIG. 4 is a schematic structural diagram of a wind turbine conveyor system.
Figure 5:
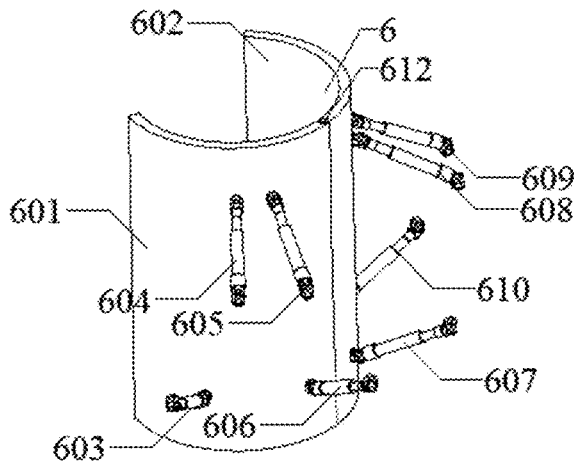
FIG. 5 is a schematic structural diagram of a clamping system.
Figure 6:
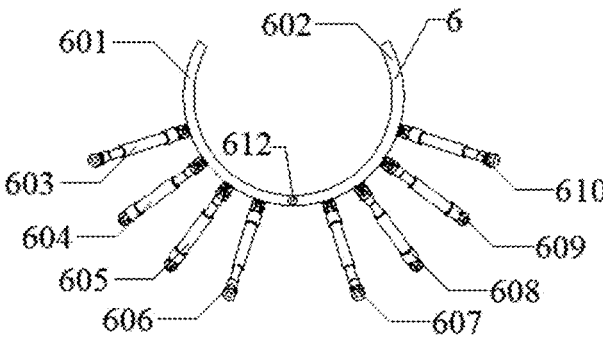
FIG. 6 is a top view of a clamping system.
Figure 7:
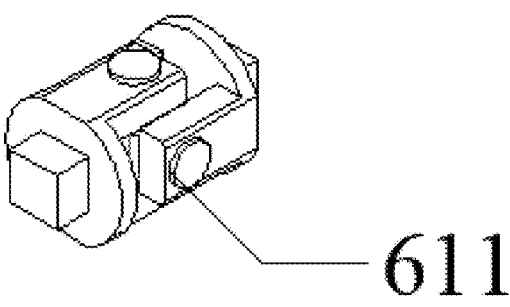
FIG. 7 is a schematic structural diagram of a Hooke hinge of clamping system.
Figure 8:
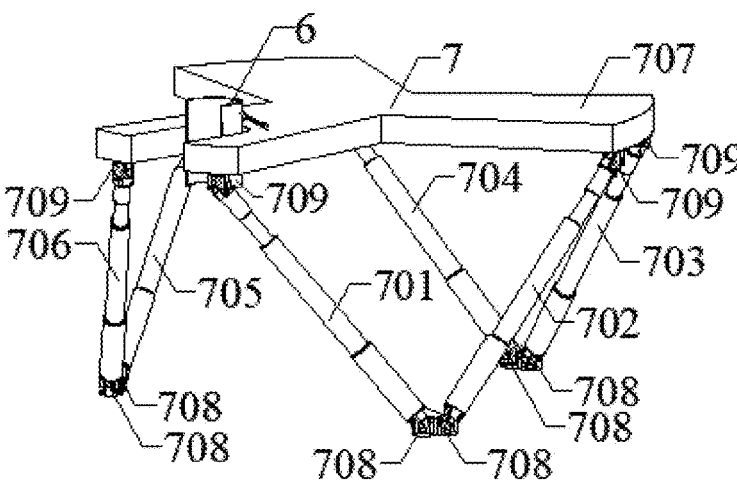
FIG. 8 is a schematic structural diagram of a six-degree-of-freedom parallel manipulator system.
Figure 9:
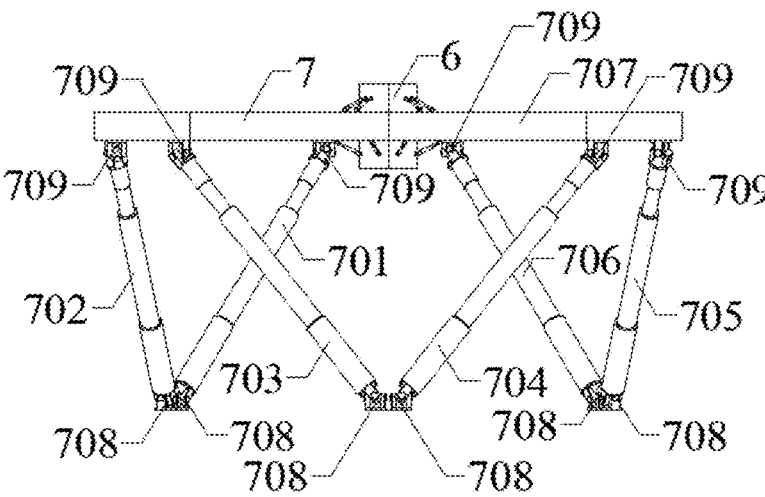
FIG. 9 is a right view of a six-degree-of-freedom parallel manipulator system.

As shown in FIGS. 1-3, the wind turbine stabilizing blocks 4 are placed on the wind turbine conveyor system 3, and the lifting equipment of the wind turbine assembly dock inserts the assembled tower of the completed wind turbines 2 into the wind turbine stabilizing blocks 4, ensuring the stability of the completed wind turbines 2 during transportation.

As shown in FIGS. 1-3, the dynamic positioning propeller system 5 comprises the propeller a 501, the propeller b 502, and the propeller c 503, which are respectively installed at the bow, middle and stern of the bottom of the hull 1. When the integrated vessel navigates to the vicinity of the foundation monopile of the wind turbine 8 to be installed, the propeller a 501, the propeller b 502, and the propeller c 503 start to work. The magnitude and direction of the output force of each propeller are obtained from the vessel control system, and the thrust generated by the dynamic positioning propeller system 5 is used to resist the environmental forces acting on the vessel caused by wind, wave, current, etc., to achieve the compensation for the low frequency motions of the integrated and to remain the integrated vessel in a certain position.

As shown in FIGS. 1-3 and FIGS. 5-9, the six-degree-of-freedom parallel manipulator system 7 comprises a total of 6 large hydraulic cylinders: the large hydraulic cylinder a 701, the large hydraulic cylinder b 702, the large hydraulic cylinder c 703, the large hydraulic cylinder d 704, the large hydraulic cylinder e 705, and the large hydraulic cylinder f 706 respectively. Additionally, the system comprises the upper table of six-degree-of-freedom parallel manipulator 707, the lower Hooke hinges 708 (a total of 6), and the upper Hooke hinges 709 (a total of 6). The lower Hooke hinges

708 (a total of 6) of the six-degree-of-freedom parallel manipulator system 7 are installed at the stern of the hull 1; each lower Hooke hinge is connected to the large hydraulic cylinder a 701, the large hydraulic cylinder b 702, the large hydraulic cylinder c 703, the large hydraulic cylinder d 704, the large hydraulic cylinder e 705, and the large hydraulic cylinder f 706 respectively; each large hydraulic cylinder is connected to one of the upper Hooke hinges 709 (a total of 6); the upper Hooke hinges are connected to the upper table of six-degree-of-freedom parallel manipulator 707. The six-degree-of-freedom parallel manipulator system 7 is used to drive the clamping system 6 to move, thereby taking out the completed wind turbine 2 from the wind turbine stabilizing block 4 and moving it to the top of the completed foundation monopile of the wind turbine 8 for installation of the completed wind turbine 2. During this process, the six-degree-of-freedom parallel manipulator system 7 compensates for the six-degree-of-freedom wave frequency motions of the integrated vessel; at the same time, the relative motion of the bottom of the tower of the complete wind turbine 2 and the top of the foundation monopile of the fixed wind turbine 8 is compensated in real time. The motion of the six-degree-of-freedom parallel manipulator system 7 and the upper table of six-degree-of-freedom parallel manipulator 707 mainly relies on the extending and shrinking of the large hydraulic cylinder a 701, the large hydraulic cylinder b 702, the large hydraulic cylinder c 703, the large hydraulic cylinder d 704, the large hydraulic cylinder e 705, the large hydraulic cylinder f 706. By changing the length of each hydraulic cylinder, the wave frequency responses of the integrated vessel are compensated to ensure the stability of the upper table of six-degree-of-freedom parallel manipulator and the clamping system.

As shown in FIGS. 1-3 and FIGS. 5-9, the clamping system 6 comprises the clamp plate a 601, the clamp plate b 602, the small hydraulic cylinder a 603, the small hydraulic cylinder b 604, the small hydraulic cylinder c 605, the small hydraulic cylinder d 606, the small hydraulic cylinder e 607, the small hydraulic cylinder f 608, the small hydraulic cylinder g 609, the small hydraulic cylinder h 610, the small Hooke hinges 611 (a total of 16), and the hinge pin 612. Some of the small Hooke hinges 611 (a total of 4) are connected to the lower surface of the upper table of six-degree-of-freedom parallel manipulator 707, and are connected to the small hydraulic cylinder a 603, the small hydraulic cylinder d 606, the small hydraulic cylinder e 607, and the small hydraulic cylinder h 610; the above four small hydraulic cylinders are connected to the lower parts of the clamp plate a 601 and clamp plate b 602 by small Hooke hinges 611 (a total of 4) respectively. Some of the small Hooke hinges 611 (a total of 4) are connected to the upper surface of the upper table of six-degree-of-freedom parallel manipulator 707, and are connected to the small hydraulic cylinder b 604, the small hydraulic cylinder c 605, the small hydraulic cylinder f 608, and the small hydraulic cylinder g 609; the above four small hydraulic cylinders are connected to the upper parts of the clamp plate a 601 and clamp plate b 602 by small Hooke hinges 611 (a total of 4) respectively. The clamp plate a 601 and clamp plate b 602 are connected in series by the hinge pin 612. The closing and opening of the clamp plate a 601 and clamp plate b 602 on the clamping system 6 mainly rely on the extending and shrinking of each small hydraulic cylinder, which ensures the convenience of the clamping system 6 to clamp the completed wind turbines 2 and the stability of the completed wind turbines 2 during the transportation process.

The above-mentioned an integrated vessel with wave compensation capability for transporting completed offshore wind turbines is used to transport and install offshore wind turbines, and the specific steps are as follows:

In the first step, the integrated vessel is berthed at the wind turbine assembly dock; the assembled completed wind turbine 2 is hoisted to the wind turbine conveyor system 3 of the integrated vessel using the lifting equipment of the dock, and placed the wind turbine above the wind turbine stabilizing block 4; the bottom of tower of the completed wind turbine 2 is inserted into the wind turbine stabilizing block 4.

In the second step, the integrated vessel navigates to the vicinity of the completed foundation monopile of the wind turbine 8; at this time, the dynamic positioning propeller system 5 starts to work. The magnitude and direction of the output forces of the propeller a 501, the propeller b 502, and the propeller c 503 are changed to accurately make the foundation monopile of the wind turbine 8 enter the installation port at the stern of the integrated vessel 9. Subsequently, the dynamic positioning propeller system 5 compensates for the low frequency motions of the integrated vessel resulting from environmental forces caused by wind, wave, current, etc., ensuring that the foundation monopile of the wind turbine 8 remains within the installation port at the stern of the integrated vessel 9.

In the third step, the wind turbine conveyor system 3 and the six-degree-of-freedom parallel manipulator system 7 start to work; the wind turbine conveyor system 3 drives the wind turbine stabilizing blocks 4 and completed wind turbines 2 towards the stern of the vessel, and the six-degree-of-freedom parallel manipulator system 7 drives the clamping system 6 to move to a position, which is parallel to the movement direction of the wind turbine conveyor system 3; subsequently, the wind turbine conveyor system 3 continues to move until the clamping system 6 reaches a position where the clamping system 6 can clamp the tower of the completed wind turbine 2.

In the fourth step, each small hydraulic cylinder of the clamping system 6 shrinks, causing the opening of clamp plate a 601 and clamp plate b 602, and the six-degree-of-freedom parallel manipulator system 7 moves. Once the clamp plate a 601 and clamp plate b 602 have been surrounded the wind turbine tower, the upper table of six-degree-of-freedom parallel manipulator system 707 moves to the designated position. Each small hydraulic cylinder of the clamping system 6 extends, causing the clamp plate a 601 and the clamp plate b 602 clamp the wind turbine tower, and the upper table of six-degree-of-freedom parallel manipulator system 707 moves upward to extract the completed wind turbine 2 from the wind turbine stabilizing block 4. The movement of the six-degree-of-freedom parallel manipulator system 7 drives the completed wind turbine 2 to the vicinity of the foundation monopile of the wind turbine 8.

In the fifth step, the six-degree-of-freedom parallel manipulator system 7 begins to compensate for the six-degree-of-freedom wave frequency motions of the integrated vessel, and the ship-mounted total station measures the relative motion between the bottom center of the wind turbine tower and the top center of the foundation monopile of the fixed wind turbine in real-time, thereby determining their relative position changes; the positional variation errors are compensated by the six-degree-of-freedom parallel manipulator system, ensuring that the bottom of the wind turbine tower remains stationary relative to the foundation monopile of the fixed wind turbine; during this process, the upper table of six-degree-of-freedom parallel manipulator system 707 gradually decreases until the bottom of tower of completed wind turbine 2 is successfully docked with the top of the foundation monopile of the fixed wind turbine 8, indicating the completion of the wind turbine installation.

In the sixth step, each small hydraulic cylinder of the clamping system 6 shrinks, the clamp plate a 601 and clamp plate b 602 open, and the six-degree-of-freedom parallel manipulator system 7 moves, allowing the clamping system 6 to disengage from the completed wind turbine 2. Then, each small hydraulic cylinder of the clamping system 6 are reset, and each large hydraulic cylinder of the six-degree-of-freedom parallel manipulator system 7 are reset.

In the seventh step, the dynamic positioning propeller system 5 propels the integrated vessel, allowing it to move away from the wind turbine that is already installed, and the integrated vessel navigates to the next location to prepare for the next installation, and repeat the above steps.

The above-mentioned the wind turbine conveyor system, each propeller, each small hydraulic cylinder, and each large hydraulic cylinder are connected to the control system of the integrated vessel. The above-mentioned each propeller, each small hydraulic cylinder, each large hydraulic cylinder, each large Hooker hinge, and each small Hooker hinge are all common standard parts or components known to those technical personnel in this field, and their structures and principles are known to those technical personnel in this field through the technical manuals or the routine experimental methods, and will not be elaborated again.

The present invention arranges the wind turbine conveyor system, the clamping system, and the six-degree-of-freedom parallel manipulator system on the integrated vessel, achieving a replacement for the widely used lifting system in current wind turbine installation and reducing the difficulty of operation. The integrated vessel realizes automated installation of wind turbines, improves work efficiency, and reduces the labor cost of wind turbine installation. During the installation process of completed wind turbine, each part is rigidly connected, which reduces the load calculation process. The dynamic positioning propeller system and the six-degree-of-freedom parallel manipulator system arranged on the integrated vessel realize the wave compensation during the overall installation process of the wind turbines, greatly increasing the operating window period of the completed wind turbine installation. The integrated vessel enables the completed wind turbines to the overall loading from the wind turbine assembly dock, transportation and installation of the completed wind turbine. It provides convenient conditions for the overall rapid installation of completed wind turbines in the offshore wind power installation industry.

The afore-mentioned of specific exemplary embodiment of the present invention has been presented for the purposes of explanation and illustration. The description is not intended to restrict the invention to the precise form disclosed, and obviously many modifications and variations are possible according to the above descriptions. The exemplary embodiment is chosen and described in order to explain certain principles of the invention and its practical applications, so that the technical personnel in this field can implement and utilize various different exemplary embodiments, and make different choices and changes to the invention. The scope of the invention is intended to be defined by the claims and their equivalents.

The invention claimed is:

1. An integrated vessel with wave compensation capability for transporting completed offshore wind turbines each comprising a wind turbine tower, comprising a hull, a bow, a middle, a stern, a deck, a wind turbine conveyor system, a dynamic positioning propeller system, and a six-degree-of-freedom parallel manipulator system arranged in the hull; the completed wind turbines are fixed on the wind turbine conveyor system by multiple wind turbine stabilizing blocks, and a clamping system is equipped in the six-degree-of-freedom parallel manipulator system;

the dynamic positioning propeller system is installed at the bottom of the hull; the system comprises a propeller a, a propeller b, and a propeller c, which is distributed in the bow, middle and stern of the vessel;

the six-degree-of-freedom parallel manipulator system is installed at the stern of the hull;

the system comprises a large hydraulic cylinder a, a large hydraulic cylinder b, a large hydraulic cylinder c, a large hydraulic cylinder d, a large hydraulic cylinder e, a large hydraulic cylinder f, an upper table of six-degree-of-freedom parallel manipulator, a lower Hooke hinge, and an upper Hooke hinge; the top of each large hydraulic cylinder is connected to the upper table of the six-degree-of-freedom parallel manipulator by the upper Hooke hinge, and the bottom is connected to the deck of the vessel by the lower Hooke hinge;

the large hydraulic cylinder a and the large hydraulic cylinder b are arranged in a V shape, the large hydraulic cylinder c and the large hydraulic cylinder d are arranged in a V shape, as well as the large hydraulic cylinder e and the large hydraulic cylinder f are arranged in a V shape;

the clamping system is located in a gap of the upper table of six-degree-of-freedom parallel manipulator; the system comprises a clamp plate a, a clamp plate b, a small hydraulic cylinder a, a small hydraulic cylinder b, a small hydraulic cylinder c, a small hydraulic cylinder d, a small hydraulic cylinder e, a small hydraulic cylinder f, a small hydraulic cylinder g, a small hydraulic cylinder h, small Hooke hinges, and a hinge pin the clamp plate a and the clamp plate b are connected to the hinge pin; one end of each the small hydraulic cylinder a, the small hydraulic cylinder b, the small hydraulic cylinder c, and the small hydraulic cylinder d are respectively connected to the clamp plate a by one or more of the small Hooke hinges, and the other ends are respectively connected to the upper table of six-degree-of-freedom parallel manipulator by one or more of the small Hooke hinges; one end of each the small hydraulic cylinder e, the small hydraulic cylinder f, the small hydraulic cylinder g, and the small hydraulic cylinder h are respectively connected to the clamp plate b by one or more of the small Hooke hinges, and the other ends are respectively connected to the upper table of six-degree-of-freedom parallel manipulator by the small Hooke hinges;

the characterized in that, an installation method of the integrated vessel is:

in the first step, the integrated vessel is berthed at a wind turbine assembly dock comprising lifting equipment; the assembled wind turbine is hoisted to the wind turbine conveyor system of the integrated vessel using the lifting equipment of the dock, and the wind turbine is placed above the wind turbine stabilizing block; the bottom of the wind turbine tower is inserted one of into the wind turbine stabilizing blocks;

in the second step, the integrated vessel navigates to the location of a completed foundation monopile of a fixed wind turbine; at this time, a dynamic positioning propeller system starts to work, and the magnitude and direction of the output force of each propeller is changed, so that the foundation monopile of the fixed wind turbine is guided into an installation port located at the stern of the integrated vessel; subsequently, the dynamic positioning propeller system compensates for low frequency motions of the integrated vessel resulting from environmental forces, ensuring that the foundation monopile of the fixed wind turbine remains within the installation port at the stern of the integrated vessel;

in the third step, the wind turbine conveyor system and the six-degree-of-freedom parallel manipulator system start to work; the wind turbine conveyor system drives the wind turbine stabilizing blocks and completed wind turbines towards the stern of the vessel, and the six-degree-of-freedom parallel manipulator system drives the clamping system to move to a position, which is parallel to the movement direction of the wind turbine conveyor system; subsequently, the wind turbine conveyor system continues to move until the clamping system reaches a position suitable for clamping;

in the fourth step, each small hydraulic cylinder of the clamping system shrinks, causing an opening of clamp plate a and clamp plate b, and moving the six-degree-of-freedom parallel manipulator system; once the clamp plate a and clamp plate b have been surrounded the wind turbine tower, the six-degree-of-freedom parallel manipulator system moves to a designated position; each small hydraulic cylinder extends, causing the two clamp plates to clamp the wind turbine tower, and the six-degree-of-freedom parallel manipulator system moves upward to extract the wind turbine tower from the wind turbine stabilizing block and transport the completed wind turbine to the top of the foundation monopile of the fixed wind turbine;

in the fifth step, the six-degree-of-freedom parallel manipulator system begins to compensate for six-degree-of-freedom wave frequency motions of the integrated vessel, and a ship-mounted total station measures a real-time relative motion between a bottom center of the wind turbine tower and a top center of the foundation monopile of the fixed wind turbine, thereby determining their relative position changes; any positional variation errors are compensated by the six-degree-of-freedom parallel manipulator system, ensuring that the bottom of the wind turbine tower remains stationary relative to the foundation monopile of the fixed wind turbine; during this process, the six-degree-of-freedom parallel manipulator system gradually decreases until the bottom of the wind turbine tower is successfully docked with the top of the foundation monopile of the fixed wind turbine, indicating the completion of the wind turbine installation;

in the sixth step, each small hydraulic cylinder of the clamping system shrinks, the two clamp plates open, and the six-degree-of-freedom parallel manipulator system moves, allowing the clamping system to disengage from the wind turbine tower, then, each small hydraulic cylinder and each large hydraulic cylinder are reset;

in the seventh step, the dynamic positioning propeller system propels the integrated vessel, allowing it to move away from the wind turbine that is already installed, and the integrated vessel navigates to another location to prepare for another installation, and repeat the above steps.

2. The integrated vessel with wave compensation capability for transporting completed offshore wind turbines according to claim 1, characterized in that the wind turbine conveyor system is equipped along a length direction of the hull; the wind turbine conveyor system comprises a conveyor belt which is wrapped around the driving wheels and the driven wheels; driving wheels and driven wheels are arranged alternately, and each driving wheel is connected to an electric motor fixed on the hull.

3. The integrated vessel with wave compensation capability for transporting completed offshore wind turbines according to claim 2, characterized in that the wind turbine stabilizing blocks are placed on the conveyor belt, wherein the wind turbine stabilizing blocks comprise grooves, and the assembled wind turbines are inserted into the grooves of the wind turbine stabilizing blocks.

4. The integrated vessel with wave compensation capability for transporting completed offshore wind turbines according to claim 1, characterized in that the small hydraulic cylinder a and the small hydraulic cylinder d are located at a lower part of the clamp plate a, and the small hydraulic cylinder b and the small hydraulic cylinder c are located at an upper part of the clamp plate a and between the small hydraulic cylinder a and the small hydraulic cylinder d; the small hydraulic cylinder e and the small hydraulic cylinder h are located at a lower part of the clamp plate b, and the small hydraulic cylinder f and the small hydraulic cylinder g are located at an upper part of the clamp plate b and between the small hydraulic cylinder e and the small hydraulic cylinder h.

\* \* \* \* \*